United States Patent [19]

Steinbeck

[11] Patent Number: 4,726,143
[45] Date of Patent: Feb. 23, 1988

[54] ROOT FERTILIZING DEVICE

[76] Inventor: John Steinbeck, 7570 46th Ave. North, St. Petersburg, Fla. 33709

[21] Appl. No.: 29,940

[22] Filed: Mar. 24, 1987

[51] Int. Cl.⁴ .............................................. A01G 29/00
[52] U.S. Cl. .................................................... 47/48.5
[58] Field of Search .................... 47/48.5, 57.5, 59; 111/7.1, 7.2

[56] References Cited

U.S. PATENT DOCUMENTS

| | | | |
|---|---|---|---|
| 349,874 | 9/1886 | Buhrer | 47/48.5 |
| 1,194,027 | 8/1916 | Kanst | 47/48.5 |
| 1,280,486 | 10/1918 | Kanst | 47/48.5 |
| 2,791,347 | 5/1957 | Boehm | 47/48.5 X |
| 3,060,012 | 10/1962 | Pavek | 47/48.5 |
| 3,319,379 | 5/1967 | Groeber | 47/48.5 |
| 3,460,562 | 8/1969 | Moulder | 47/48.5 |
| 3,755,966 | 9/1973 | Smith | 47/48.5 |

FOREIGN PATENT DOCUMENTS

| | | | |
|---|---|---|---|
| 3523099 | 1/1987 | Fed. Rep. of Germany | 47/48.5 |
| 125381 | 1/1941 | Hungary | 47/48.5 |
| 8302998 | 3/1985 | Netherlands | 47/57.5 |

*Primary Examiner*—Robert A. Hafer
*Assistant Examiner*—Danton D. DeMille
*Attorney, Agent, or Firm*—Herbert W. Larson; Joseph C. Mason, Jr.

[57] ABSTRACT

The device is a cylindrical housing enclosing a spaced apart cylindrical receptacle for fertilizer. Metering rings channel rain water towards the fertilizer but prevent fertilizer from exiting the top of the housing. End grates enclose the open ends of the housing, the top grate containing a water permeable filter to prevent clogging of the device by foreign debris.

8 Claims, 8 Drawing Figures

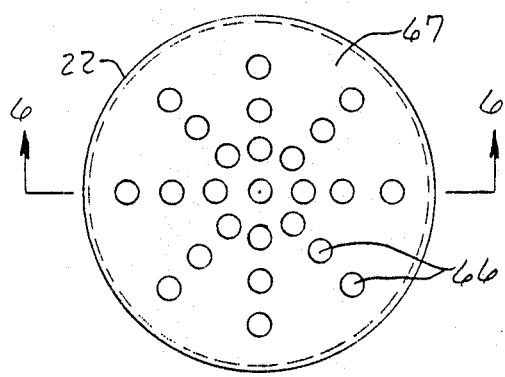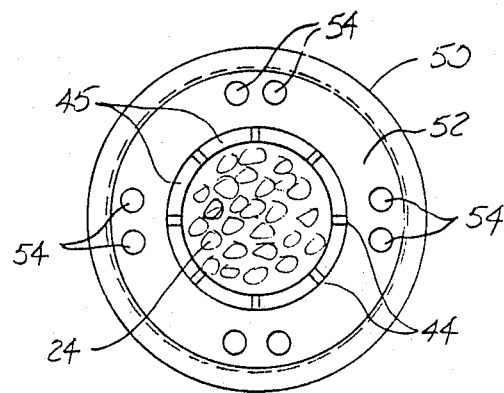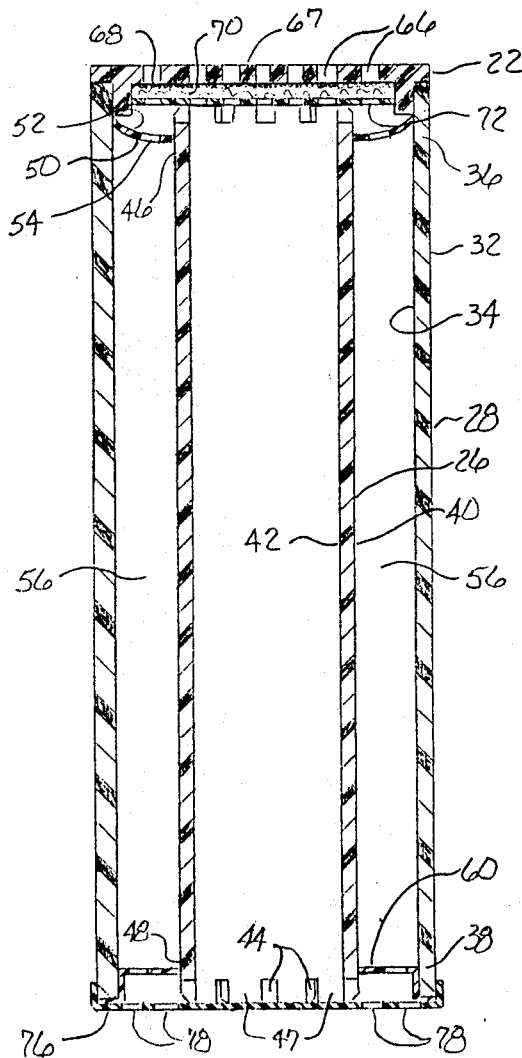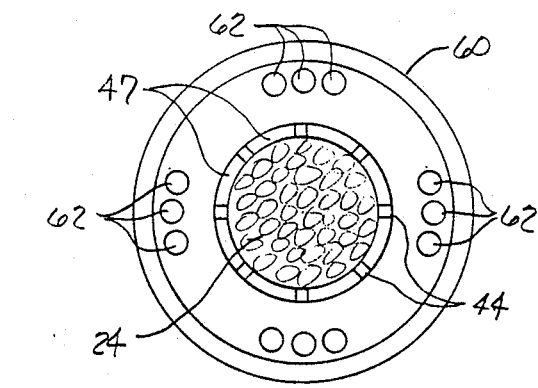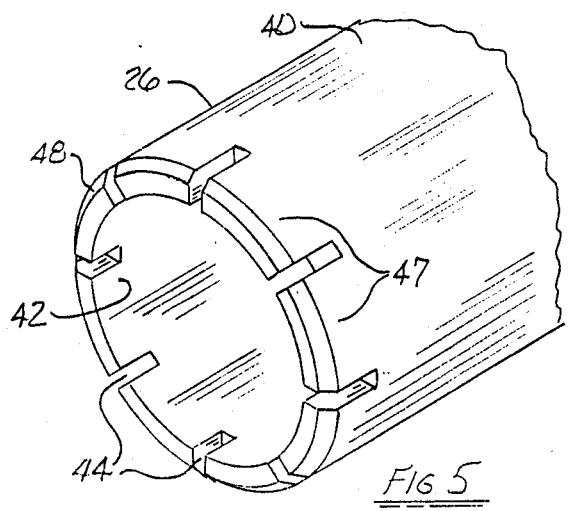

ROOT FERTILIZING DEVICE

DESCRIPTION

1. Technical Field

This invention relates to a root fertilizing device. More particularly, it refers to a device for insertion into the ground along the drip line of a tree to continuously provide fertilizer from an interior of the device to leach into the tree root system.

2. Background Art

The prior art is replete with descriptions of devices containing fertilizer, usually cylindrical in shape, inserted into the ground for feeding root systems. Examples of these devices can be seen in the following patents:

U.S. Pat. Nos.: 73,442
349,874
419,242
790,910
1,029,107
1,490,865
1,530,109
1,971,390
2,380,721
2,791,347
3,060,012
3,319,379
3,755,966 and
Hungarian Pat. No.: 125,381.

Of particular interest to the present invention are U.S. Pat. No. 3,319,379 and No. 3,755,966. The former patent describes a fertilizing device having an outer cylindrical tube and an inner hollow cylindrical tube with a fluted bottom edge to allow fertilizer granules to mix with water flowing down a space between the outer and inner tube. The device also has a screen member at its top. The latter patent also describes a cylindrical outer tube and a cylindrical inner tube. The inner tube has an upper outward flange, allowing it to rest on an upper stepped section of the outer cylindrical tube. Although both these patents describe tree fertilizing devices, they suffer from limitations. The former patent describes a device that allows fertilizer to dissipate too rapidly if the surrounding soil is sandy. The latter patent describes a device that may fill up with water during a severe rain storm and permit fertilizer to float to the surface and be washed away without providing benefit to the intended tree root system.

SUMMARY OF THE INVENTION

I have invented a root feeder that solves the problems with the prior art devices and provides a device that feeds roots in all types of soil without permitting fertilizer to be dissipated by surface water runoff.

My device contains a cylindrical outer housing open at both ends and a cylindrical inner fertilizer receptacle open at both ends and spaced apart from an inner side wall of the outer housing. A first metering ring having a top surface tapered inwardly is fit into the top of the inner receptacle and a flat second metering ring is fit into a bottom of the inner receptacle. The inner receptacle together with the end rings is fit within the outer housing so that a water conducting channel surrounds the inner receptacle. A top grate having a water permeable filter encloses the top of the outer cylinder and a bottom grate having a multiplicity of holes on its outer edge encloses the bottom of the outer cylinder. Fertilizer is added to the inner receptacle on a preset schedule of about once each quarter to continuously make fertilizer available for the roots when the device is inserted in a hole along the drip line of a tree or large bush.

BRIEF DESCRIPTION OF THE DRAWINGS

The present invention may be best understood by those having ordinary skill in the art by reference to the following detailed description when considered in conjunction with the accompanying drawings in which:

FIG. 2 is a plan view of the device of this invention.

FIG. 3 is a plan view of the device with the top grate removed.

FIG. 4 is a plan view of the device with both the top grate and top meter ring removed.

FIG. 5 is a partial perspective view of the inner receptacle.

FIG. 6 is a sectional elevation view of the device of this invention.

DETAILED DESCRIPTION OF THE INVENTION

Figure 1:
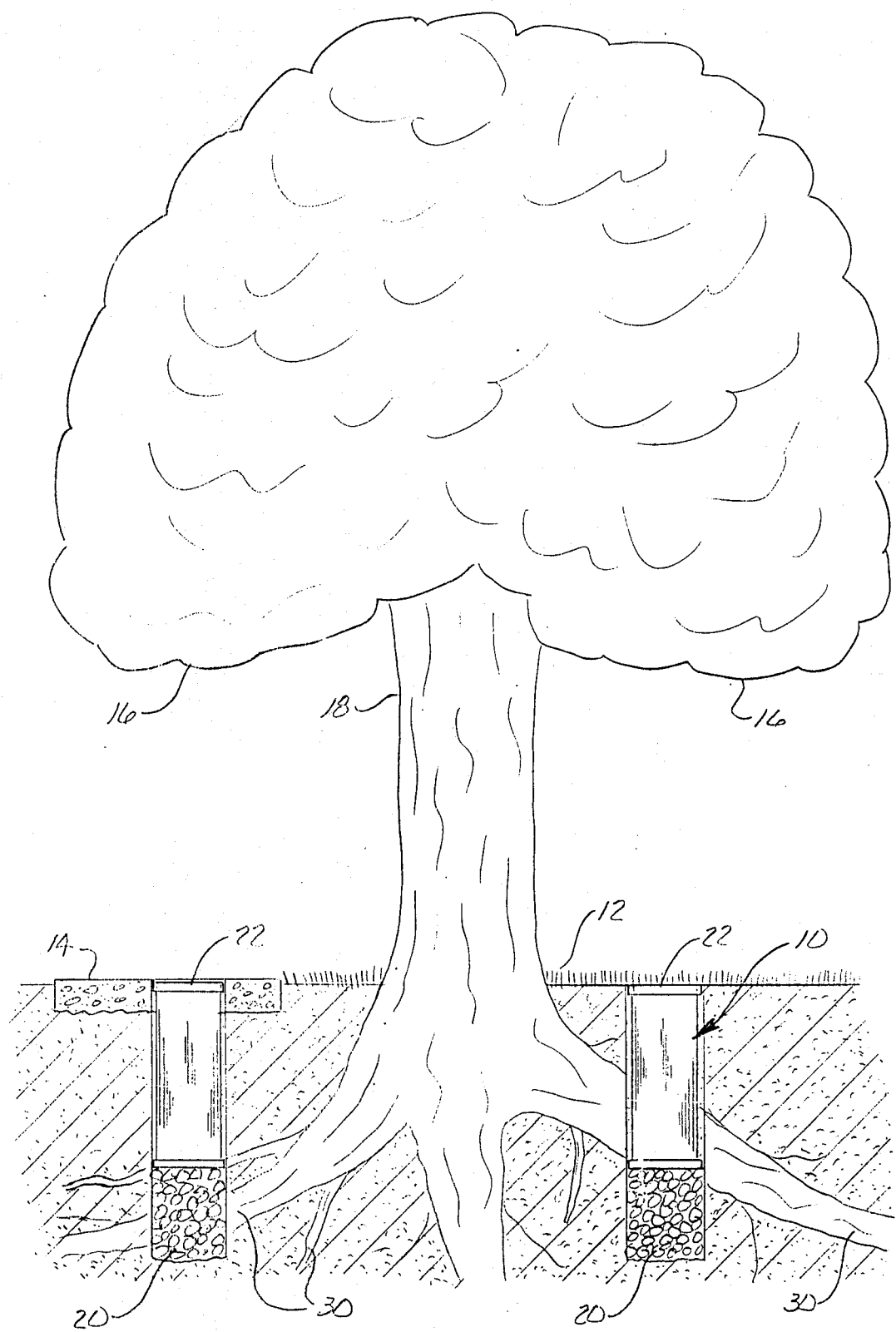
FIG. 1 is a cross-sectional view of the device of this invention inserted into a hole either through concrete or soil at the drip line of a growing tree.
Figure 7:
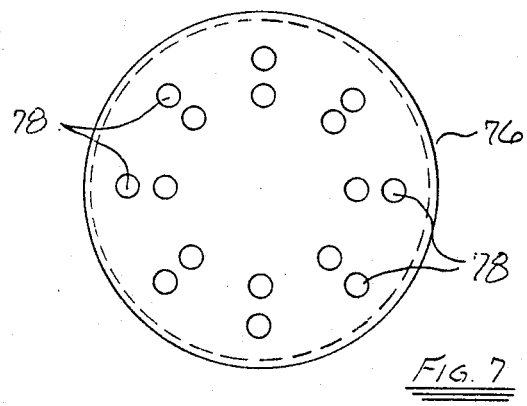
FIG. 7 is a bottom view of the device of this invention.
Figure 8:
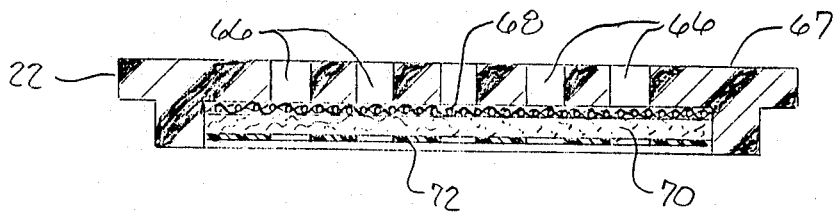
FIG. 8 is a sectional view of the top grate with a water permeable filter.

Throughout the following detailed description the same reference numerals refer to the same elements in all figures.

The root fertilizing device 10 of this invention is inserted into a hole in soil 12 or concrete 14 under the drip line 16 of a tree 18 or under a large bush. In a preferred embodiment, it is necessary to put a layer of gravel 20 at the bottom of the hole so that the root feeding device 10 can rest on top of the gravel and have its top grate 22 flush with the surface of the concrete 14 or soil 12. Rain falling down into the root feeding device 10 passes through fertilizer 24 located within an inner cylindrical receptacle 26 which in turn is mounted within an outer cylindrical housing 28. The rain falling through the fertilizer 24 flushes it out at a slow pace as will be described in more detail hereafter. In this manner the fertilizer slowly feeds the roots 30 of tree 18.

The outer cylindrical housing 28 has an exterior wall 32 and an interior wall 34 and is open at a top end 36 and a bottom end 38.

The inner cylindrical receptacle 26 is mounted within but spaced apart from the inner wall 34 of housing 28. The inner cylindrical receptacle 26 has an exterior wall 40 and an inner wall 42 with a plurality of notches 44 traversing through exterior wall 40 and interior wall 42 at a first end 46 and at a second end 48.

A top metering ring 50 is mounted at the base of the notches 44 flush against spokes 45 in the first open end 46 of receptacle 26. The top surface 52 of metering ring 50 tapers in a downward direction from inner wall 34 of housing 28 to the outer wall 40 of receptacle 26. The top metering ring 50 also has a plurality of holes 54 through the ring surface to allow water overflowing from inner receptacle 26 to flow down through chamber 56 and then out through the bottom openings 78 of bottom grate 76.

A bottom planer metering ring 60 is mounted at the base of notches 44 flush against spokes 47 in the second end 48 of receptacle 26. This metering ring also has holes 62 for allowing water to flow through while at the same time maintaining channel 56 and the space relationship of receptacle 26 from the inside wall 34 of housing 28.

The top grate 22 acts as a cover over end 36 of housing 28. This top grate 22 has a plurality of holes 66 throughout its top surface 67 and a screen 68 just below the holes. Below the screen 68 is a fiberglass filter 70 held in place by a thin holding plate 72 having multiple holes therein. This top grate 22 allows moisture into the root feeding device 10 of the invention but prevents entry into it of foreign particles such as mud and debris of a general nature. The fiberglass filter 70 can be replaced periodically by pulling out holding plate 72. It is suggested that the filter be replaced at least once per quarter when fertilizer is inserted into receptacle 26. The top grate 22 is removed by inserting a tool into hole 66 and pulling up. The inner receptacle 24 can then be filled with fertilizer and grate 22 is replaced merely by pushing down to press fit the grate on the inner surface 34 of the top end 36 of housing 28.

A bottom grate 76 having peripheral holes 78 is snapped over the bottom 38 of housing 28. The central or core portion of bottom grate 76 is solid and therefore prevents fertilizer from falling directly out from receptacle 26. Rather, the fertilizer must be metered out through metering ring 60 and then through the holes 78 along the outer edge of bottom grate 76. This controls the amount of fertilizer leaving the device and prevents large amounts from exiting after a substantial downpour. Excess water passes through channel 56 and exits through holes 78 in grate 76.

The outer housing 28, the receptacle 26, the metering rings 50 and 60, as well as the grates 22 and 76 are all made of a high strength plastic such as polyvinylchloride polymer, a reinforced polyethylene polymer or a polyacrylic polymer. A higher strength polymer will be necessary for use on tree feeding devices 10 employed with concrete surfaces where heavy loads are expected from automobiles or trucks. The top surface of grate 22 can be scratched to provide a rough surface to prevent anyone walking across the grate 22 from slipping. The fertilizer employed can be any of the types having well known adaptability in the tree feeding arts.

My device provides a method by which fertilizer retained within the receptacle 26 is metered out at a usable rate for the roots of trees or large bushes under which the device 10 is inserted. The channel 56 provides a route for excess water to move out from the recepticle without unduly diluting the fertilizer. The grate 76 prevents large amounts of fertilizer from exiting from the bottom of device 10 during heavy rainfalls. Rather, the fertilizer mixed with water must exit through holes 78 in grate 76. Finally, the top grate 22 provides a means for preventing contamination of my device from foreign particles such as seeds, buds and other debris that might be occasioned by heavy rainfalls to wash into device 10. The simplicity of the parts and the ability to press fit the various parts together allows for the production of an inexpensive root feeding device.

It can be understood that the present invention describing a root feeding device can be made using equivalent parts without departing from the basic inventive concept.

Having thus described the invention, what is claimed and desired to be secured by Letters Patent is:

1. An underground root fertilizing device comprising:
    (a) an outer cylindrical housing having an exterior face and inner face, the housing being open at a top end and at a bottom end,
    (b) means mounting an inner cylindrical receptacle within but spaced apart from the inner face of the housing, the receptacle having an exterior and inner wall surface with a plurality of notches, the notches extending through the wall of the receptacle at first and second open ends of the cylindrical receptacle,
    (c) a top metering ring mounted around the first open end of the receptacle, a top surface of the top metering ring tapering in a downward direction from the inner face of the housing,
    (d) a bottom planar metering ring mounted around the second open end of the receptacle,
    (e) a top grate having a top and bottom surface with a plurality of holes through the grate and a water permeable filter covering the bottom surface of the grate, the top grate enclosing the open top end of the housing,
    (f) a bottom grate having a plurality of holes adjacent an outer edge of the bottom grate, the bottom grate enclosing the open bottom end of the housing, and
    (g) means removably connecting the top grate to the open top, whereby the receptacle can be filled with fertilizer by removing the top grate.

2. The underground root fertilizing device according to claim 1 wherein the device is inserted into a vertical hole in soil under the drip line of a tree with the top grate substantially flush with the surface of the soil.

3. The underground root fertilizing device according to claim 1 wherein the device is inserted into a vertical hole through a concrete body under the drip line of a tree with the top grate substantially flush with the surface of the surrounding concrete.

4. The underground root fertilizing device according to claim 1 wherein the housing, receptacle, spacer rings and grates are made from a high strength polymer.

5. The underground root fertilizing device according to claim 1 wherein the housing, receptacle, metering rings and grates are made from a polyvinylchloride polymer.

6. The underground root fertilizing device according to claim 1 wherein the housing receptable, spacer rings and grates are made from a polyacrylic polymer.

7. The underground root fertilizing device according to claim 1 wherein the metering rings have multiple through holes adjacent an outer edge.

8. The underground root fertilizing device according to claim 1 wherein a core of the bottom grate is solid polymer.

* * * * *